United States Patent [19]

Novinson

[11] Patent Number: 5,480,482
[45] Date of Patent: Jan. 2, 1996

[54] REVERSIBLE THERMOCHROMIC PIGMENTS

[75] Inventor: Thomas Novinson, Ventura, Calif.

[73] Assignee: The United States of America as represented by the Secretary of the Navy, Washington, D.C.

[21] Appl. No.: 97,802

[22] Filed: Jul. 27, 1993

Related U.S. Application Data

[63] Continuation-in-part of Ser. No. 787,340, Nov. 4, 1991, abandoned.

[51] Int. Cl.$^6$ ............................. C08K 5/16; C09B 11/08; G02B 5/23; G03C 5/00
[52] U.S. Cl. .................... 106/498; 8/526; 252/583; 252/586; 252/600; 252/962; 428/913; 430/962
[58] Field of Search ...................... 252/583, 586, 252/600, 962; 359/241; 428/402.24, 913; 8/526; 106/498; 430/964

[56] References Cited

U.S. PATENT DOCUMENTS

| | | | |
|---|---|---|---|
| 4,121,011 | 10/1978 | Glover et al. | 252/408.1 X |
| 4,230,776 | 10/1980 | Kosaka | 430/964 X |
| 4,409,156 | 10/1983 | Hoshi et al. | 8/526 X |
| 4,515,877 | 5/1985 | Barzynski et al. | 428/913 X |
| 4,620,941 | 11/1986 | Yoshikawa et al. | 252/408.1 |
| 4,681,791 | 7/1987 | Shibahashi et al. | 428/913 X |
| 4,717,710 | 1/1988 | Shimizu et al. | 252/586 X |
| 4,755,831 | 7/1988 | Sakamoto | 430/964 X |
| 4,764,500 | 8/1988 | Araki et al. | 428/913 X |
| 4,851,282 | 7/1989 | Shimizu et al. | 428/913 X |
| 4,857,410 | 8/1989 | Yamahata | 428/913 X |
| 4,931,221 | 6/1990 | Heller | 252/586 |

FOREIGN PATENT DOCUMENTS

| | | | |
|---|---|---|---|
| 0058727 | 5/1979 | Japan | 106/498 |

Primary Examiner—Richard D. Lovering
Attorney, Agent, or Firm—David S. Kalmbaugh; Melvin J. Sliwka

[57] ABSTRACT

A color changing pigment composition which changes color reversibly when heated comprising (a) a cyclic aryl lactone dye, (b) a diaminoalkane activator and (c) an ester. The pigment composition can also include a white pigment such as titanium dioxide as an opacifier or a yellow dye such Hansa yellow G. The pigment composition changes from a dark color, e.g. blue, to white when the composition is heated to a specified temperature, e.g. to a temperature of 52° C., and reversibly changes from white back to the blue color when the pigment composition is cooled, e.g. to a temperature below about 25° C.

4 Claims, No Drawings

REVERSIBLE THERMOCHROMIC
PIGMENTS

This application is a continuation-in-part of application Ser. No. 07/787,340, filed Nov. 04, 1991, now abandoned.

BACKGROUND OF THE INVENTION

1. Field of the Invention

This invention relates generally to thermochromic materials and, in particular, to thermochromic pigments which are reversible color pigments that change from a dark color to colorless in the presence of heat or thermal energy, and then darken to the original color as the pigment is cooled.

2. Background of the Invention

In the past thermochromic color changing materials or pigments have generally been used in paints, inks, dyes and dyed fabrics. Thermochromic pigments have also been used in toys, dolls, recording media and novelties such as seals on beverage mugs that change color when a hot or cold beverage is placed in the mug.

For example U.S. Pat. No. 4,681,791 to Shibahashi et.al. describes a textile material in the form of fiber, raw stock, yarn or fabric comprising a plurality of fibers coated with a thermochromic layer containing a binder and a thermochromic pigment which includes an electron-donating, color former, an electron-accepting developer and a color changing controlling agent. Other prior art patents which disclose color changing compounds include U.S. Pat. No. 4,851,282 to Shimizu et al. which discloses material comprising a core covered with a thermochromic vinyl chloride resin sol composition which undergoes a reversible color change upon detecting a change in temperature and U.S. Pat. No. 4,931,221 to Heller which discloses photochromic benzopyran and naphthopyran spiran compounds which change color when exposed to light radiation involving ultraviolet rays.

A number of these prior art thermochromic pigments or materials are formed using an organic dye, an acid activator and a low melting solid such as ester or alcohol that acts as a solvent when liquified. The thermochromic mixtures of the prior art are generally dark or colored when cool or at room temperature, but becomes decolorized when heated or warmed to the melting point of the solid solvent.

The acid activators used in these prior art color changing pigments or materials include phenols, carboxylic acids, phosphinic and phosphonic acids and metal salts of these acids. Although these acid activators are quite effective in causing reversible color changes in thermochromic pigments or thermobleaching of the thermochromic dyes, these activators gradually deteriorate the organic dyes used in prior art color changing pigments causing an irreversible color change.

With the disadvantages inherent in prior art color changing pigments and materials when used, for example, in textile materials, in paints and coatings and as inks, the reversible thermochromic pigments constituting the present invention were conceived and one object of the invention is to provide novel pigment compositions that change color reversibly from a dark color when cold or at room temperature, to colorless when heated or hot at a specific controlled temperature.

Another object of the present invention is to provide a pigment composition of reversible color which can be incorporated into paints, coatings, inks, dyes and textile materials to eliminate the above described limitations including the elimination of irreversible color change in the thermochromic pigments.

Yet another object of the present invention is to provide a pigment composition which can be microencapsulated in an alkaline media, the acid catalyzed composition of the prior art.

Various other advantages and objectives of the present invention will become apparent to those skilled in the art by the detailed description of the invention and preferred embodiments.

SUMMARY OF THE INVENTION

The present invention overcomes some of the disadvantages of the prior art including those mentioned above in that it provides for novel color changing pigments or materials in which (a) the pigments are generally dark at room temperature or below (approximately 25° C. or lower) and (b) the pigments loose their color and becomes colorless at higher temperatures (approximately 30° C.–70° C.), thus undergoing a reversible color transition from dark to light and from light to dark above and below a defined temperature range. The result is that such reversible thermochromic pigments may be used, for example, in paints, coatings and textile materials, dyes and inks.

The present invention comprises a three component, reversible color pigment mixture that is a dark color at room temperature or below (25° C. or less) but becomes colorless at higher temperatures (30° C. or higher). The pigment color change is reversible through many cycles of heating and cooling. The components of the pigment mixture are (a) a colorless cyclic aryl lactone dye that undergoes ring opening to form a colored triarylmethylene carboxylic acid dye, (b) an alkaline activator agent that causes such ring opening of the aryl lactone dye when the mixture is warmed and ring closure of the triarylmethylene carboxylic acid dye to a colorless cyclic aryl lactone, when the mixture is cooled and (c) a low melting solid which may be a waxy ester or alcohol and which in the molten state functions as a solvent to dissolve the dyes and the activator and permits the activator to react with the dyes to change the color of the dyes.

The activator agent used in the preferred embodiments of the present invention comprises a series of diaminoalkanes and related compounds that act as alkaline activators for thermochromic pigments. The diaminoalkanes, in turn, are very effective in inducing reversible color changes in the following types of organic dyes (a) aryl lactone dyes (also referred to as triarylmethanes) and (b) phthalimidoxanthenones (also referred to as xanthenones).

Since the color change in the thermochromic pigments of the present invention appear as a change from a dark color, such as black, blue, green or red, to colorless, that is no color, an opacifier in the form of a white pigment may added to the thermochromic pigments so that the change appears to go from colored to white. Fixed pigments may also be added, such as Hansa yellow G, so that a color change from blue to yellow will occur with a blue thermochromic dye.

There are several advantages to the thermochromic pigments of the present invention including the following: (a) the pigments change from dark (black, blue, red, green) to colorless when heated, (b) the pigments change from dark (black, blue, etc.) to white when a white pigment is incorporated as an opacifier or to yellow when a yellow dye such as Hansa yellow G is added to the mixture, (c) the color changes occurs in a desired direction from dark to light with heat and from light to dark with cooling, (d) the diaminoalkane activators are suitable for use with acid sensitive dyes, and (d) the color stability and reversibility of the pigments over many cycles of heating and cooling is significantly enhanced.

DETAILED DESCRIPTION OF THE INVENTION AND PREFERRED EMBODIMENTS

The thermochromic pigments of the present invention consists essentially of three components, namely an aryl lactone dye that changes color upon heating and cooling, an alkaline activator that causes the color change, and a low melting, waxy ester.

The dyes that give the color change are aryl lactones which appear to undergo a ring opening to a colored triarylmethylene carboxylic acid dye upon cooling and a ring closure of the latter dye to the colorless lactone upon heating, in the presence of an activator which in the preferred embodiments of the present invention are diaminoalkanes. Representative examples of these activators include the following: diaminomethane; 1,3-diaminopropanol; 1,2-diaminomethane; 1,3-diaminopropane; 1,4-diaminobutane; 1,5-diaminopentane; 1,6-diaminohexane; 1,7-diaminoheptane; 1,8-diaminooctane; 1,9-diaminononane; 1,10-diaminodecane; 1,2-diaminocyclohexane; 1,4-diaminopiperazine; 3,6-diaminodurene; 2,7-diaminofluorene; 1,3-diamino-2hydroxypropane; diaminomalonitrile; 2,4-diaminomesitylene; 1,2-diamino-2-methylpropane; 1,5-diaminonaphthalene; 3,7-diamino-2-methoxyfluorene; 2,4-diaminotoluene; 2,6-diaminotoluene; 3,4-diaminotoluene and 3,5-diamino-1,2,4-triazole. In addition, hydrochloride salts of these diaminoalkanes may be used as activators.

Specific examples of dyes which undergo color changes caused by these diaminoalkane activators and their color changes are as follows:

TABLE 1

| Dyes |
| --- |
| 6-(dimethylamino)-3,3-bis(dimethylaminophenyl)-1-(3H) isobenzofuranone (also known as crystal violet lactone) (blue to colorless) |
| 2'-anilino-6-diethylamino-3-methylfluoran (black to colorless) |
| 2'-dibenzylamino-6'-diethylaminofluoran (green to colorless) |
| 3,3-bis-(1-butyl-2-methyl-1-H-indol-3-yl)-1(3H)-isobenzofuranone (red to colorless) |
| 3-(4-dimethylaminophenyl)-3-[N,N'-bis(4-octylphenyl)amino]phthalide (orange to colorless) |

These are well known dyes generally available in commerce from companies such as Eastman Kodak Co. of Rochester, N.Y. or Aldrich Chemical Co. of Milwaukee, Wis. These dyes are all available in the colorless lactone form. When the colorless lactone is heated with a long chain, waxy ester in the presence of the activator, a colorless melt is obtained at about 70°–80° C. When the colorless melt is cooled down to about 25° C., the mixture solidifies and becomes colored. When the colored mixtures are heated again, they liquefy and become colorless melts.

Other examples of color reversible dyes in their leuco forms which can be employed include the following:

TABLE 2

| Common Name | Chemical Name |
| --- | --- |
| Rose Bengal lactone | 2,4,8,10-tetraiodo-3,9-dihydroxy-6(3',4',5',6'-tetrachlorophenyl-2-phthalido)xanthenone |
| o-cresolphthalein complexone | 3,3-bis(4'hydroxy-3'-methyl-5'-dicarboxymethylamino-methyl)phenylisobenzofuran-3-one |
| sulfobromophthalein sodium salt | 3,3-bis(sodium 3'-sulfonato-4'-hydroxyphenyl)-4,5,6,7-tetrabromoisobenzofuran-3-one |
| tetrabromophenol-phthalein bromocresol green thymolphthalien | 3,3-bis(3',5'-dibromo-4-hydroxyphenyl)isobenzofuran-3-one |

Many other derivatives of the triarylmethanes and xanthenones can be used as the organic dye in the thermochromic pigment mixtures of the present invention, including those derivatives having the following substituents: iodo, bromo, chloro, fluoro, methyl, ethyl, isopropyl, sulfonyl, trifluoromethyl, nitro, amino, dimethylamino, diethylamino, dipropylamino, dibutylamino, dihexylamino, dioctylamino, n-octylamino, n-hexylamino, n-butylamino, n-propylamino, t-butylamino, hydroxy, methoxy, ethoxy, propoxy, carboxy, sulfonyl, methylcarbonyl, phenoxy or phenylcarbonyl.

The diaminoalkane activator or agent functions as a ring opening and closing agent for the dye. In the presence of the activator and under suitable temperature conditions the lactone ring of the colorless dye opens up to form a colored triarylmethylene carboxylic acid. The color change is due to the formation of a conjugated ring system in the carboxylic acid dye. The colored carboxylic acid isomer absorbs color in the visible region of the spectrum to enable one to see the visible color. When the carboxylic acid isomer of the dye recyclizes in the presence of the activator and under suitable temperature conditions to the lactone form, the absorbance shifts to the ultraviolet which gives the dye its colorless appearance. However, it is understood that applicant is not bound by this theory as to how the color change of the dye occurs in the presence of the activator. The activator compounds are the diaminoalkanes which function as ring opening and closing agents for the cyclic aryl lactone dyes.

The third component of the pigment composition of the invention is a low temperature melting solid solvent (either an ester or alcohol) or dispersing agent for the dye and activator which permits the color change in the dye from a dark color to colorless when the dye composition is heated, e.g. to between about 30° C. and about 70° C., and changes from colorless to a dark color when the pigment composition is cooled to room temperature, that is about 25° C. Such solid solvent is preferably a low temperature melting, long chain, waxy ester that melts in the range of, e.g., 10° C. to about 50° C. Such esters are capable of dissolving both the aryl lactone dye and the triarylmethylene carboxylic acid dye, as well as the activator, when in the molten state. If the ester has a melting point of about 25° C., then the pigment composition would be colored below 25° C. and colorless at about 25° C. If instead an ester is chosen having a melting point of 18° C., the color will be visible below 18° C. and disappear above 18° C. Likewise if an ester is selected having a melting point of 35° C. to 40° C., the color will be visible below about 35° C.

Examples of such dispersing agents or esters include the following: methyl stearate, ethyl stearate, methyl hexanoate, methyl heptanoate, methyl octanoate, methyl laurate, methyl oleate, methyl adipate, methyl caprylate, methyl caproate, methyl anthranilate, methyl palmitate, methyl palmitoleate, methyl oxalate, methyl 2-nonanoate, methyl benzoate, 2-methylbenzophenone, methyl behenate(docosonoate), methyl benzilate, methylbenzyl acetate, trimethyl borate, methyl caprate(decanoate), methyl butyrate, methyl decanoate, methyl cyclohexanecarboxylate, methyl dimethoxyacetate, methyl diphenylacetate, methyl enanthate, methyl heptaoate(enanthate) and methyl linoleate. These dispersing agents are all commercially available from Aldrich and Kodak.

The length or number of carbon atoms in the alkyl chain of the waxy ester depends on the temperature at which it is desired that the pigment complex change color, e.g. 25° C.–30° C., or 35° C.–40° C., etc. Thus, the transition temperature of the wax from the solid to a liquid depends on the length of the alkyl chain in the waxy ester, the longer such alkyl chain, the higher the transition temperature.

It is believed that the solid ester keeps the diaminoalkane from reacting with the aryl lactone dye while the mixture is solid but allows the diaminoalkane to react with the aryl lactone dye when the mixture is melted, thereby causing the ring to open and close.

The components of the dye composition, namely (a) the dye, (b) the activator or ring opening and closing agent, and (c) the low melting waxy ester, may be mixed in a weight ratio of the dye to the ring opening and closing agent to the ester ranging from 1:1:5 to 1:5:100. Preferably, the weight ratio of the dye to the activator to the ester ranges from 1:1:10 to 1:2:50.

Thus, for example, the (a) diaminoalkanes, (b) the colorless aryl lactone dyes and (c) the low melting ester may be mixed in a ratio, e.g. of 1:2:25 or 1:2:50 and may be melted together at 80°–100° C., e.g. 70° C. to 90° C. to form a homogeneous mixture. The colorless materials are heated for about 20 minutes and then cooled to give a black, red, green or blue mixture, depending upon the dye used in the thermochromic pigment.

Since the pigment compositions of the invention changes from a colored to a colorless form upon heating, and the waxy material will completely decolorize, a dye or an opacifier or opacifying agent may be added to the three component pigment mixture which would result in a white or a yellow pigment. The opacifier or opacifying agent which can be added to the three component dye mixture for this purpose include titanium dioxide, zinc oxide, tin oxide and lead carbonate. Titanium dioxide, $TiO_2$ is a preferred white pigment since it is an excellent infrared reflector and thus reflects both heat and light when the pigment is in its colorless state. Hansa yellow G and barium chromate are excellent yellow pigments.

The white pigment, e.g. titanium dioxide, may be added to the three-component pigment mixture in an amount of about 1 to about 10 parts of the white pigment to 10 parts of the three component pigment composition by weight, to thus function as an opacifier and a white reflecting agent. Thus, for example, titanium dioxide may be added to the three component pigment mixture of the invention in a ratio, by weight, of 1:10 of the pigment mixture.

When the black, red, green or blue three-component pigment mixture containing white pigment, e.g. titania, is heated to say 35° C. to 70° C., the color discharges and becomes white, that is, the dye becomes colorless and the titanium dioxide is visible. When the mixture cools below 25° C., the pigment is colored, e.g. blue, and the titania white is masked.

The following are examples of practice of the invention:

EXAMPLE 1

A mixture of 6.36 grams (0.01 mol) of o-cresolphthalein and 1.16 grams (0.01 mol) of 1,6-diaminohexane in 30 milliters of phenyl benzoate was heated for about 65 minutes at about 85° C. and then allowed to cool to 25° C. The mixture was heated in a PYREX glass test tube placed in an oil bath. Thermocouples were used to monitor the temperature of the oil bath such that the bath temperature would remain constant during heating.

The resulting thermochromic solid mixture was a mauve (red-violet) color at room temperature, about. 25° C., but became colorless when the mixture was heated to about 52° C.

EXAMPLE 2

A mixture of 7.2 grams (0.01 mol) of bromocresol green and 1.14 grams (0.01 mol) of 1,2-diaminocyclohexane in 30 milliters of methyl 3-hydroxybenzoate (melting point 72°–74° C.) was heated for about 95 minutes at about 90° C. and then allowed to cool to 25° C. The mixture was again heated in a PYREX glass test tube placed in an oil bath and thermocouples were used to monitor the temperature of the oil bath such that the bath temperature would remain constant during heating.

The resulting thermochromic solid mixture was a blue-green (aquamarine) color at room temperature, about 25° C., but became colorless when the mixture was heated to about 65° C.

EXAMPLE 3

A mixture of 8.38 grams (0.01 mol) of sulfobromophthalein and 1.76 grams (0.02 mol) of 1,4-diaminobutane in 30 milliters of methyl 2-furoate (melting point 73° C.) was heated for about 50 minutes at about 105° C. and then allowed to cool to 25° C. The mixture was again heated in a PYREX glass test tube placed in an oil bath and thermocouples were used to monitor the temperature of the oil bath such that the bath temperature would remain constant during heating.

The resulting thermochromic solid mixture was a purple color at room temperature, about 25° C., but became colorless when the mixture was heated to about 52° C.

EXAMPLE 4

A mixture of 9.74 grams (0.01 mol) of Rose Bengal lactone and 1.44 grams (0.01 mol) of 1,8-diaminooctane in 30 milliters of methyl 2-hydroxyisobutyrate (boiling point 137° C.) was heated for about 75 minutes at about 136° C. and then allowed to cool to 25° C. The mixture was again heated in a PYREX glass test tube placed in an oil bath and thermocouples were used to monitor the temperature of the oil bath such that the bath temperature would remain constant during heating.

The resulting thermochromic solid mixture was a rose red color at room temperature, about 25° C. but became colorless when the mixture was heated to about 70° C.

EXAMPLE 5

A mixture of 4.3 grams (0.01 mol) of thymolphthalein and 2.00 grams (0.01 mol) of 1,12-diaminododecane in 30 milliters of methyl 2-methylbenzoate (boiling point 207°–208° C.) was heated for about 2 hours at about 120° C. and then allowed to cool to 25° C. The mixture was again heated in a PYREX glass test tube placed in an oil bath and thermocouples were used to monitor the temperature of the oil bath such that the bath temperature would remain constant during heating.

The resulting thermochromic solid mixture was a violet-blue color at room temperature, about 25° C., but became colorless when the mixture was heated to about 65° C.

From the foregoing, it is seen that the present invention provides novel thermochromic pigment compositions which changes color reversibly from a dark color when cold to a colorless isomer when hot and which can be incorporated after microencapsulation into elastomers, plastics, dyes, paints, coatings or the like.

The pigment composition of the invention has the following advantages: (a) such pigment composition changes color in the desired direction, dark to colorless with an increase in temperature and (b) the pigment composition of the invention reversibly changes color many times by heating and cooling in temperature range of about 25° C. to about 70° C.

Since various changes and modifications can be made in the invention without departing from the spirit of the invention, the invention is not to be taken as limited except by the scope of the appended claims.

What is claimed is:

1. A thermochromic pigment composition which changes color reversibly from a dark color to colorless when said pigment composition is heated to a temperature range of between 50° C. and 70° C. and changes from colorless to said dark color when said pigment composition is cooled to a temperature of about 25° C., said thermochromic pigment composition consisting of:

(a) a colorless aryl lactone dye capable of ring opening to a colored triarylmethylene carboxylic acid dye wherein said colorless aryl lactone dye is selected from the group consisting of o-cresolphthalein, bromocresol green, sulfobromophthalein, Rose Bengal actone and thymolphthalein;

(b) an diaminoalkane activator that acts to open the ring of said aryl lactone dye and to produce ring closure of said carboxylic acid dye; and (c) a low temperature melting waxy ester which allows said change from said dark color to colorless when said thermochromic pigment composition is heated to said temperature range of between 50° C. and 70° C. and said change from colorless to said dark color when said pigment composition is cooled to a temperature of about 25° C.

2. The thermochromic pigment composition of claim 1 wherein said diaminoalkane activator is selected from the group consisting of 1,6-diaminohexane, 1,2-diaminocyclohexane, 1,4-diaminobutane, 1,8-diaminooctane and 1,12-diaminododecane.

3. The thermochromic pigment composition of claim 1 wherein said waxy ester is selected from the group consisting of phenyl benzoate, methyl 3-hydroxybenzoate, methyl 2-furoate, methyl 2-hydroxyisobutyrate and methyl 2methylbenzoate.

4. A thermochromic pigment composition which changes color reversibly from a dark color to colorless when said pigment composition is heated to a temperature range of between 50° C. and 70° C. and changes from colorless to said dark color when said pigment composition is cooled to a temperature of about 25° C., said thermochromic pigment composition consisting of:

(a) a colorless aryl lactone dye capable of ring opening to a colored triarylmethylene carboxylic acid dye, said colorless aryl lactone dye being selected from the group consisting of o-cresolphthalein, bromocresol green, sulfobromophthalein, Rose Bengal lactone and thymolphthalein;

(b) an diaminoalkane activator that acts to open the ring of said aryl lactone dye and to produce ring closure of said carboxylic acid dye, said diaminoalkane activator being selected from the group consisting of 1,6-diaminohexane, 1,2-diaminocyclohexane, 1,4-diaminobutane, 1,8-diaminooctane and 1,12 diaminododecane; and (c) a low temperature melting waxy ester which allows said change from said dark color to colorless when said thermochromic pigment composition is heated to said temperature range of between 50° C. and 70° C. and said change from colorless to said dark color when said pigment composition is cooled to a temperature of about 25° C. said low temperature melting waxy ester being selected from the group consisting of phenyl benzoate, methyl 3-hydroxybenzoate, methyl 2-furoate, methyl 2-hydroxyisobutyrate and methyl 2-methylbenzoate.

* * * * *